United States Patent [19]
Jackson

[11] 3,910,001
[45] Oct. 7, 1975

[54] BEAM CONNECTOR
[75] Inventor: Edgar D. Jackson, Alta Loma, Calif.
[73] Assignee: Steel Web Corporation, Alta Loma, Calif.
[22] Filed: June 10, 1974
[21] Appl. No.: 477,627

[52] U.S. Cl. .................. 52/281; 52/483; 52/692; 52/696; 52/712; 52/751; 52/760; 403/391
[51] Int. Cl.² ..... E04B 5/00; E04C 3/12; F16B 1/00
[58] Field of Search ............ 52/710, 712, 715, 690, 52/692, 696, 483, 730, 753 L, 760, 751, 752, 281, 758 G, 289, 370, 728, 376; 83/13; 403/389, 391, 405, 406, 403

[56] References Cited
UNITED STATES PATENTS

| | | | |
|---|---|---|---|
| 979,628 | 12/1910 | Wright et al. | 52/370 |
| 1,307,340 | 6/1919 | Benedict | 403/391 |
| 1,803,723 | 5/1931 | Murphy | 52/752 X |
| 2,019,230 | 10/1935 | Lyon | 52/289 X |
| 2,386,887 | 10/1945 | Eckel | 52/715 X |
| 2,389,964 | 11/1945 | Eckel | 52/715 X |
| 2,721,362 | 10/1955 | McCoy et al. | 52/760 X |
| 2,902,951 | 9/1959 | Maag | 52/751 X |
| 3,299,586 | 1/1967 | Hookaday | 403/403 X |
| 3,646,725 | 3/1972 | Troutner | 52/693 X |
| 3,744,206 | 7/1973 | Nelson et al. | 52/721 X |

FOREIGN PATENTS OR APPLICATIONS

| | | | |
|---|---|---|---|
| 246,605 | 1/1961 | Australia | 52/483 |

*Primary Examiner*—Ernest R. Purser
*Assistant Examiner*—Leslie A. Braun
*Attorney, Agent, or Firm*—William W. Haefliger

[57] ABSTRACT

A simple, one-piece connector retains beams in side-by-side relation and is deformable to enable rapid flush leveling and interconnection of such beams.

8 Claims, 5 Drawing Figures

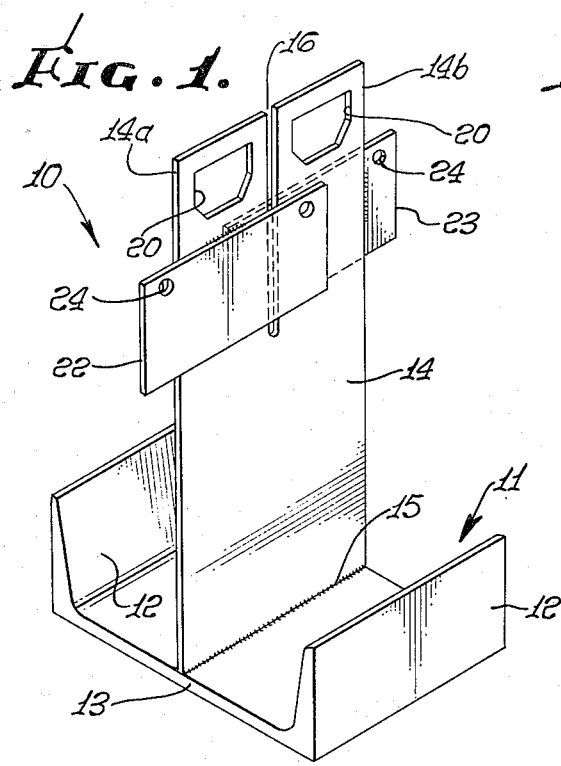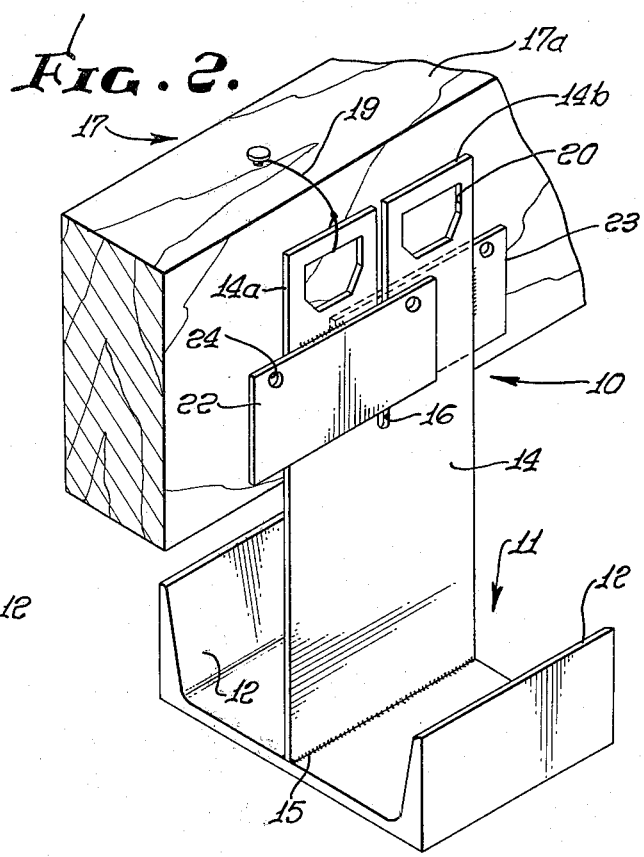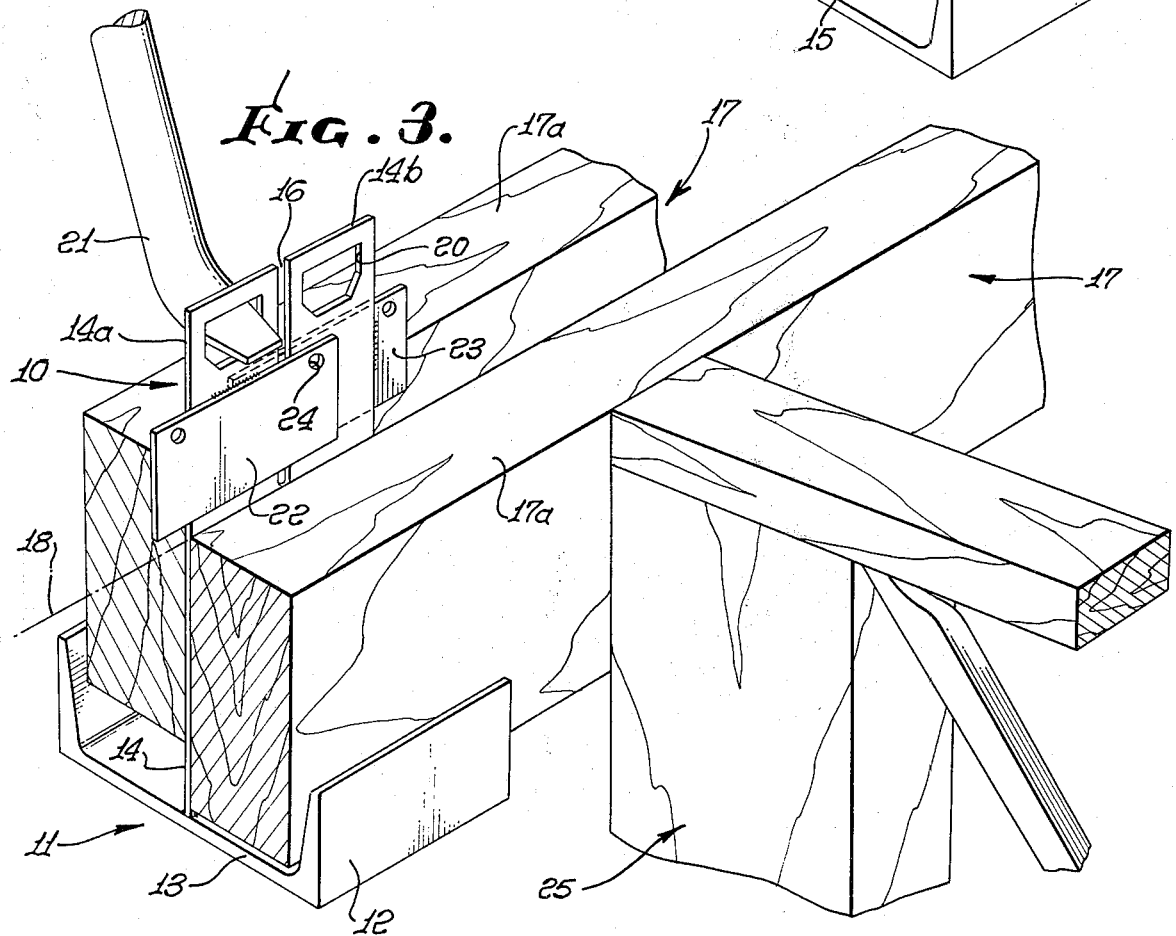

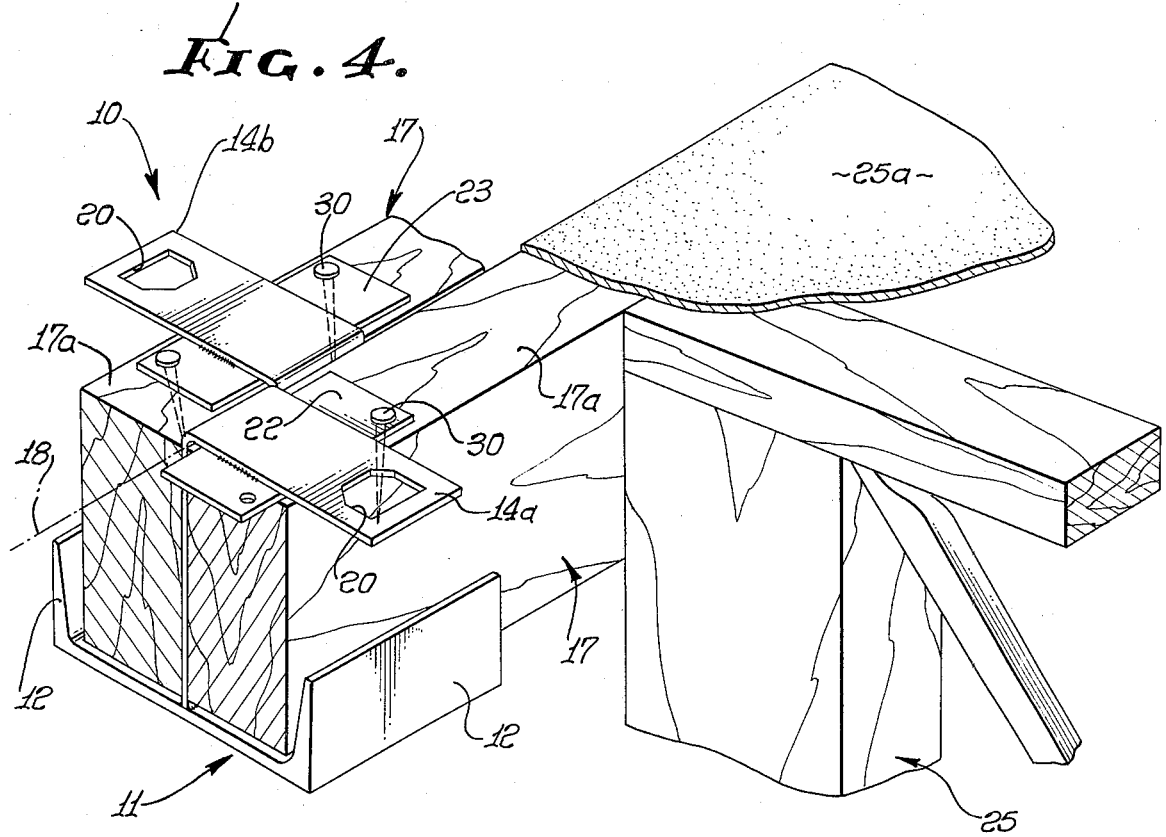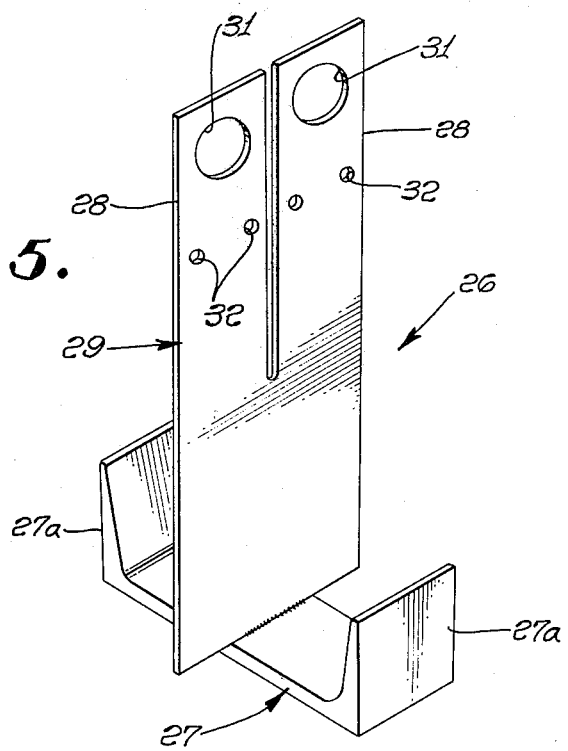

BEAM CONNECTOR

BACKGROUND OF THE INVENTION

This invention relates generally to the connection of relatively heavy beams in side-by-side relation, and more particularly concerns a simple connector enabling rapid flush leveling and interconnection of such beams.

In the past, heavy parallel beams were typically joined together as by metallic connectors formed as halves and bolted together above and below the beams. It was difficult to level the beams to enable their connection as described, and the resultant connection was disadvantageous in that it projected above the beams to facilitate bolting of connector halves. No way was known to level and interconnect heavy beams in the simple and unusually advantageous manner as now afforded by the present invention.

SUMMARY OF THE INVENTION

It is a major object of the invention to provide a simple one-piece connector enabling leveling and interconnection of beams in a rapid and simple manner and to form a high strength, reliable connection. Basically, it comprises
  a. a base in the form of a channel having laterally spaced flanges upstanding from a base web,
  b. a plate integral with said web and upstanding in a plane spaced between the flanges and parallel thereto, the plate extending substantially above the top levels of the flanges,
  c. the plate including a pair of tabs forming a vertical slot therebetween at a level above the tops of said beams receivable in the channel at opposite sides of the plate with the beams extending longitudinally, the tabs being downwardly bendable in opposite directions about longitudinal axes toward the tops of said beams for attachment thereto.

Further, the tabs contain through openings to receive pry bars to level the beams and also to bend the tabs as described; and auxiliary plates may be integrally carried by the tabs to facilitate their attachment to the beam tops, as will be described.

These and other objects and advantages of the invention, as well as details of illustrative embodiments, will be more fully understood from the following description and drawings, in which:

DRAWING DESCRIPTION

FIG. 1 is a perspective showing of one form of connector;

FIG. 2 is a perspective view of the FIG. 1 connector showing one form of use;

FIG. 3 is a perspective view of the FIG. 1 connector showing another use of same;

FIG. 4 is a perspective view of the FIG. 1 connector after complete connection to two beams; and FIG. 5 is a perspective view of a modified connector.

DETAILED DESCRIPTION

In each of FIGS. 1–4 the metallic connector 10 comprises a base 11 in the form of a channel having laterally spaced flanges 12 upstanding from a horizontal base web 13. A plate 14 is integral with the base, as by welding connection 15, and is upstanding in a vertical longitudinal plane spaced between the flanges to which the plate is parallel.

The plate extends or projects substantially above the top level of the like flanges 12, and it includes a pair of tabs 14a and 14b forming a vertical split or slot 16 therebetween. The slot 16 extends generally above the tops 17a of two beams 17 fully received into the channel 11 at opposite sides of the plate, as seen in FIG. 4. As there shown, the beams extend longitudinally, and may consist of wood or other non-metallic material. Normally, the slot will extend downwardly from the top edge of the plate to a level close to or slightly below the beam tops 17a.

The tabs are shown as downwardly bendable in opposite lateral directions about a longitudinal axis or axes 18 toward the tops of the beams for attachment thereto, thereby to retain the side-by-side beams in top leveled or flush relation. FIG. 2 shows the connector 10 suspended as by a wire 19 to one of the beams until both beams are moved into side-by-side relation. For example, the beams may be integral with two separate floors, decks or roof sections, to be "parked" together and interconnected.

Such preliminary parking may result in an out-of-level condition of the beams by virtue of the positioning of the heavy separate structures to which they are connected, such a condition being represented in FIG. 3. In these circumstances, a further aspect of the invention enables ease of leveling. In this regard, the tabs contain through openings 20 for receiving a prying implement or bar seen at 21, the latter being operable to pry down the relatively high beam, as by means of a block inserted between the underside of the bar 21 and the top of the higher beam. Thereafter, the bar may be used to bend the tabs laterally, to FIG. 4 positions, by insertion in the openings 20 and prying downwardly.

Two like auxiliary plates 22 and 23 are respectively integral with the tabs, plate 22 facing in one lateral direction and plate 23 facing in the opposite lateral direction. Both plates overlap the slot 16. Plate 22 is swung down clockwise in FIG. 4 to engage the top of the right side beam, and plate 23 is swung down counterclockwise in that view to engage the top of the left side beam. Note that both plates contain openings 24 at longitudinally opposite sides of the tabs to receive fasteners such as nails 30 to attach the plates to the beams. Therefore, the plates have longitudinal lengths exceeding those of the tabs and which are preferably approximately equal to the longitudinal length of the base, for optimum strength.

Floor, deck or roof beam structure attached to the beam or beams is indicated generally at 25 in FIGS. 3 and 4, and a roof or deck at 25a.

FIG. 5 shows a modified connector 26 wherein the longitudinal length of the central upstanding plate 29 is about twice that of the base 27 and flanges 27a. Therefore, the longitudinal lengths of the like tabs 28 are about equal to the base longitudinal length, and the auxiliary plates, as described above, may be omitted. Pry bar openings in the tabs appear at 31, and fastener openings at 32.

It should also be noted that the downward connection of the tabs 14a and 14b can be made over the roof deck 25a. This is important in connecting beams with roof sections completed, as in mobile homes.

I claim:

1. A two beam connector comprising
  a. a base in the form of a channel having laterally spaced flanges upstanding from a base web, b. a plate integral with said web and upstanding in a plane spaced between the flanges and parallel thereto, the plate extending substantially above the top levels of the flanges, c. the plate including a pair of tabs forming a vertical slot therebetween at a level above the tops of said beams receivable into the channel at opposite sides of the plate with the beams extending longitudinally, the tabs being downwardly bendable in opposite directions about longitudinal axes toward the tops of said beams for attachment thereto, d. there being two auxiliary plates respectively integral with the tabs, one auxiliary plate facing in one lateral direction to be swung downwardly on one tab to engage the top of one beam, and the other auxiliary plate facing in the opposite lateral direction to be swung downwardly on the other tab to engage the top of the other beam.

2. The connector of claim 1 wherein said tabs contain through openings for receiving a prying implement for bending the tabs as described.

3. The connector of claim 1 wherein said auxiliary plates have longitudinal length approximately equal to the longitudinal length of said base.

4. The connector of claim 1 wherein each auxiliary plate projects longitudinally beyond the longitudinally spaced edges of the tab with which the plate is integral, the auxiliary plates also containing openings to pass fasteners for attaching the plate to the beam.

5. The connector of claim 4 wherein each tab contains a through opening at a level above the auxiliary plate integral with that tab, for reception of a prying implement for bending the tab as described.

6. The connector of claim 1 including said beams received into the channel as described, the beams consisting of non-metallic material.

7. The connector of claim 6 wherein said tabs are downwardly bent, as described, and attached by fasteners to the tops of the beams.

8. The connector of claim 7 including a roof deck on a beam, the associated tab overlying the roof deck.

* * * * *